US010305654B2

(12) United States Patent
Seo et al.

(10) Patent No.: US 10,305,654 B2
(45) Date of Patent: May 28, 2019

(54) REFERENCE SIGNAL TRANSMISSION METHOD IN UNLICENSED BAND IN WIRELESS COMMUNICATION SYSTEM AND APPARATUS THEREFOR

(71) Applicant: LG ELECTRONICS INC., Seoul (KR)

(72) Inventors: Hanbyul Seo, Seoul (KR); Joonkui Ahn, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/323,074

(22) PCT Filed: Jul. 6, 2015

(86) PCT No.: PCT/KR2015/006920
§ 371 (c)(1),
(2) Date: Dec. 29, 2016

(87) PCT Pub. No.: WO2016/006886
PCT Pub. Date: Jan. 14, 2016

(65) Prior Publication Data
US 2017/0141897 A1 May 18, 2017

Related U.S. Application Data

(60) Provisional application No. 62/021,678, filed on Jul. 7, 2014, provisional application No. 62/161,233, filed on May 13, 2015.

(51) Int. Cl.
H04L 5/00 (2006.01)
H04B 17/345 (2015.01)
(Continued)

(52) U.S. Cl.
CPC ......... *H04L 5/0048* (2013.01); *H04B 17/345* (2015.01); *H04L 5/005* (2013.01);
(Continued)

(58) Field of Classification Search
CPC ..... H04W 52/00; H04W 52/04; H04W 28/06; H04W 74/0808; H04W 52/367;
(Continued)

(56) References Cited

U.S. PATENT DOCUMENTS

| 2013/0194951 | A1* | 8/2013 | Kim | H04W 72/005 370/252 |
| 2013/0244709 | A1* | 9/2013 | Davydov | H04W 72/0413 455/501 |
| 2013/0267268 | A1* | 10/2013 | Lee | H04B 7/0632 455/509 |
| 2014/0016497 | A1 | 1/2014 | Seo et al. | |
| 2014/0036881 | A1 | 2/2014 | Kim et al. | |

(Continued)

FOREIGN PATENT DOCUMENTS

| CN | 102379098 | 3/2012 |
| CN | 103477579 | 12/2013 |

(Continued)

OTHER PUBLICATIONS

PCT International Application No. PCT/KR2015/006920, Written Opinion of the International Searching Authority dated Oct. 26, 2015, 27 pages.

(Continued)

Primary Examiner — Jung Liu
(74) Attorney, Agent, or Firm — Lee Hong Degerman Kang & Waimey

(57) ABSTRACT

In the present application, disclosed is a method for reporting channel state information in an unlicensed band to a base station by a terminal in a wireless communication system. Specifically, the method comprises the steps of: receiving,
(Continued)

from the base station, information on a reference signal resource for interference measurement through an upper layer; calculating channel state information using the reference signal resource for the interference measurement; and reporting the channel state information to the base station, wherein the reference signal resource for the interference measurement is configured by two or more reference signal patterns, and the two or more reference signal patterns are mapped to different time resources, respectively.

8 Claims, 18 Drawing Sheets

(51) Int. Cl.
*H04W 24/10* (2009.01)
*H04W 72/04* (2009.01)
(52) U.S. Cl.
CPC .......... *H04L 5/0007* (2013.01); *H04L 5/0091* (2013.01); *H04W 24/10* (2013.01); *H04W 72/042* (2013.01); *H04W 72/0453* (2013.01)
(58) Field of Classification Search
CPC ............... H04W 72/044; H04W 74/08; H04W 72/0446; H04W 72/042; H04W 72/0406; H04W 72/04; H04W 72/00; H04W 72/0413; H04W 4/023; H04L 5/00; H04L 5/003; H04L 1/1829; H04L 1/0003; H04L 1/18; H04L 1/1861; H04L 1/0002; H04J 11/0069
See application file for complete search history.

(56) References Cited

U.S. PATENT DOCUMENTS

| | | | |
|---|---|---|---|
| 2014/0071931 A1 | 3/2014 | Lee et al. | |
| 2014/0126402 A1 | 5/2014 | Nam et al. | |
| 2014/0185480 A1* | 7/2014 | Lee .................... | H04W 36/30 370/252 |
| 2015/0215022 A1* | 7/2015 | Nagata .................... | H04L 5/001 370/329 |
| 2015/0229452 A1* | 8/2015 | Nagata .................. | H04L 5/0051 370/252 |
| 2015/0256307 A1* | 9/2015 | Nagata .................. | H04L 5/0051 370/328 |
| 2015/0358133 A1* | 12/2015 | Kusashima ........... | H04W 76/04 370/280 |
| 2017/0332377 A1* | 11/2017 | Tseng .................... | H04W 24/00 |

FOREIGN PATENT DOCUMENTS

| | | |
|---|---|---|
| WO | 2013006988 | 1/2013 |
| WO | 2013167557 | 11/2013 |
| WO | 2014052175 | 4/2014 |
| WO | 2014072814 | 5/2014 |

OTHER PUBLICATIONS

European Patent Office Application Serial No. 15819515.6, Search Report dated Dec. 22, 2017, 8 pages.
State Intellectual Property Office of the People's Republic of China Application Serial No. 201580037018.1, Office Action dated Aug. 20, 2018, 12 pages.

* cited by examiner

FIG. 2
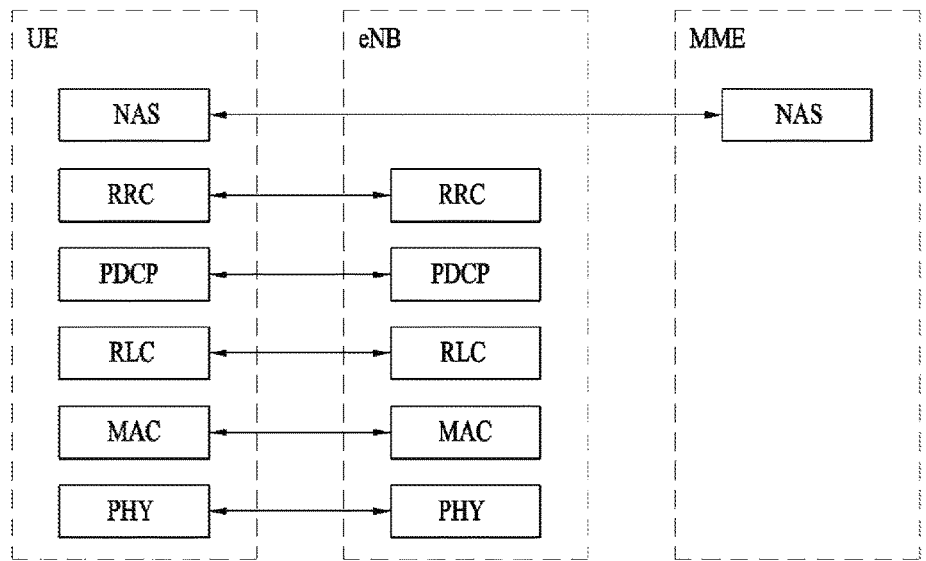
(A) CONTROL-PLANE PROTOCOL STACK
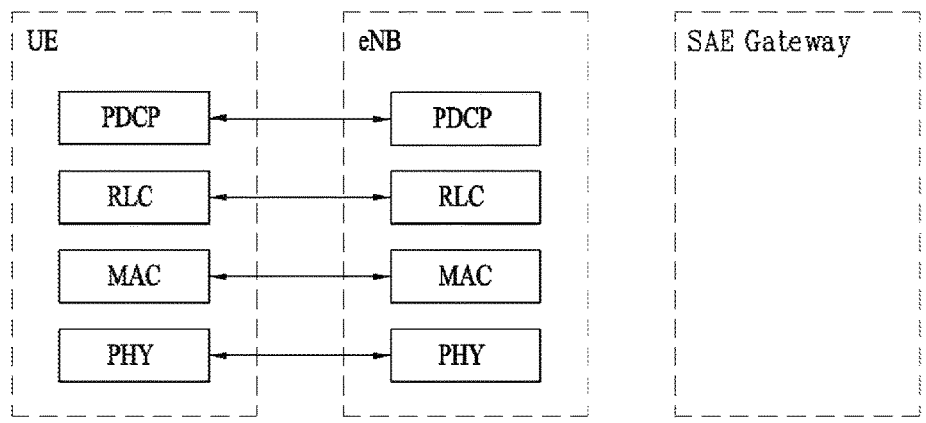
(B) USER-PLANE PROTOCOL STACK

☒ : DMRS GROUP 1

☒ : DMRS GROUP 2

REFERENCE SIGNAL TRANSMISSION METHOD IN UNLICENSED BAND IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2015/006920, filed on Jul. 6, 2015, which claims the benefit of U.S. Provisional Application No. 62/021,678, filed on Jul. 7, 2014 and 62/161,233, filed on May 13, 2015, the contents of which are all hereby incorporated by reference herein in their entirety.

TECHNICAL FIELD

The present invention relates to a wireless communication system, and more particularly, to a method of transmitting a reference signal in an unlicensed band in a wireless communication system and an apparatus therefor.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF THE INVENTION

Technical Task

Based on the aforementioned discussion, the present invention intends to propose a method of transmitting a reference signal in an unlicensed band in a wireless communication system and an apparatus therefor in the following description.

Technical Solution

To achieve these and other advantages and in accordance with the purpose of the present invention, as embodied and broadly described, according to one embodiment, a method of reporting channel state information by a user equipment (UE) to an eNB in an unlicensed band in a wireless communication system, includes receiving information on a reference signal resource for interference measurement from the eNB through a higher layer, calculating channel state information using the reference signal resource for the interference measurement, and reporting the channel state information to the eNB. In this case, the reference signal resource for the interference measurement includes two or more reference signal patterns and each of the two or more reference signal patterns is mapped to a different time resource.

In addition, the method can further include receiving information on a ZP (zero power) reference signal resource from the eNB through the higher layer and receiving a downlink data channel under an assumption that the downlink data channel is not received in the ZP reference signal resource. In this case, the ZP reference signal resource includes two or more reference signal patterns and each of the two or more reference signal patterns is mapped to a different time resource.

To further achieve these and other advantages and in accordance with the purpose of the present invention, a method of receiving channel state information by an eNB from a user equipment (UE) in an unlicensed band in a wireless communication system, includes providing information on a reference signal resource to the UE through a higher layer and receiving channel state information, which is calculated using the reference signal resource for the interference measurement, from the UE. In this case, the reference signal resource for the interference measurement includes two or more reference signal patterns and each of the two or more reference signal patterns is mapped to a different time resource.

In addition, the method can further include providing information on a ZP (zero power) reference signal resource to the UE through a higher layer and transmitting a downlink data channel to the UE. In this case, the UE receives the downlink data channel under an assumption that the downlink data channel is not transmitted in the ZP reference signal resource, the ZP reference signal resource includes two or more reference signal patterns, and each of the two or more reference signal patterns is mapped to a different time resource.

In the embodiments, each of the two or more reference signal patterns is defined by two antenna ports. Specifically, each of the two or more reference signal patterns can indicate a reference signal resource which is mapped to an identical frequency resource in two time resources adjacent to each other.

On the contrary, the reference signal resource for the interference measurement in a licensed band rather than the unlicensed band includes a reference signal pattern defined by four antenna ports.

Advantageous Effects

According to embodiments of the present invention, it is able to efficiently transmit a reference signal for an unlicensed band in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 2 is a diagram illustrating structures of a control plane and a user plane of a radio interface protocol between a user equipment and E-UTRAN based on the 3GPP radio access network standard;

BEST MODE

Mode for Invention

Figure 1:
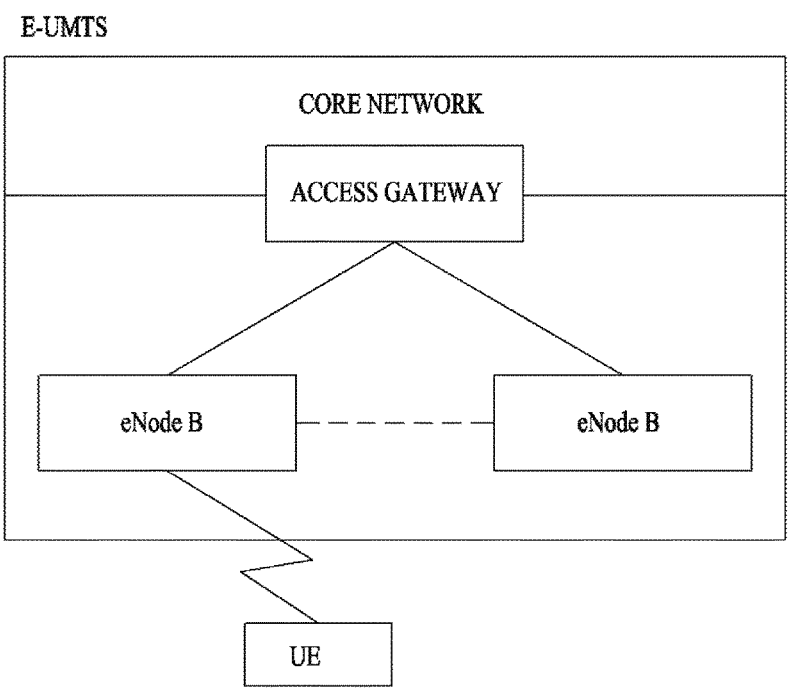
FIG. 1 is a schematic diagram of E-UMTS network structure as one example of a wireless communication system.

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

In the present specification, a name of a base station can be used as a comprehensive terminology including an RRH (remote radio head), an eNB, a TP (transmission point), an RP (reception point), a relay, and the like.

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. If there is RRC connection between a user equipment and an RRC layer of a network, the user equipment is in an RRC connected mode. Otherwise, the user equipment is in an RRC idle mode. A NAS (non-access stratum) layer, which is located at the top of the RRC layer, performs such a function as session management and mobility management.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH). Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 3:
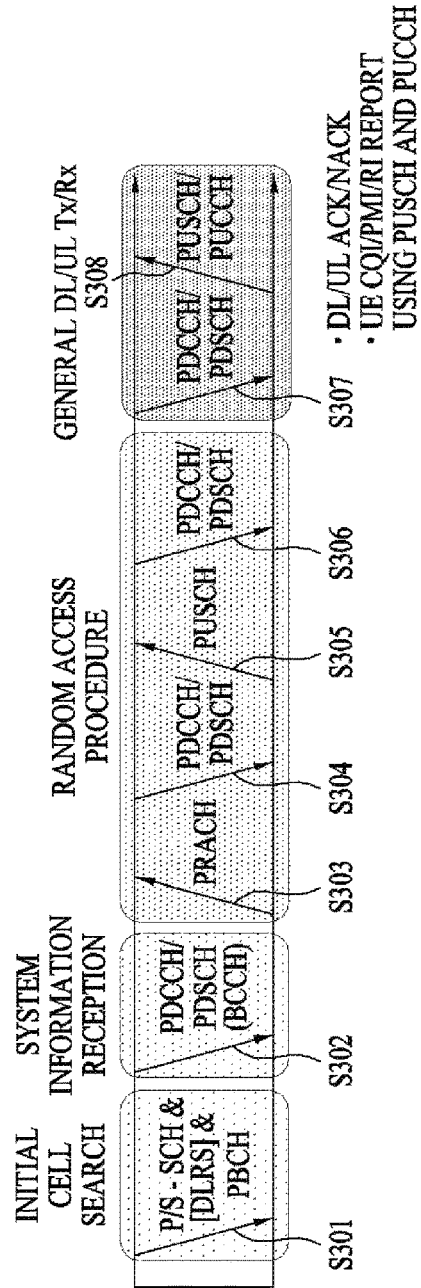
FIG. 3 is a diagram illustrating physical channels used in a 3GPP LTE system and a general method for transmitting a signal using the physical channels.

FIG. 3 is a diagram showing physical channels used in a 3GPP system and a general signal transmission method using the same.

When a UE is powered on or enters a new cell, the UE performs an initial cell search operation such as synchronization with an eNB (S301). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S302).

When the UE initially accesses the eNB or has no radio resources for signal transmission, the UE may perform a random access procedure (RACH) with respect to the eNB (steps S303 to S306). To this end, the UE may transmit a specific sequence as a preamble through a physical random access channel (PRACH) (S303 and S305) and receive a response message to the preamble through the PDCCH and the PDSCH corresponding thereto (S304 and S306). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S308), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
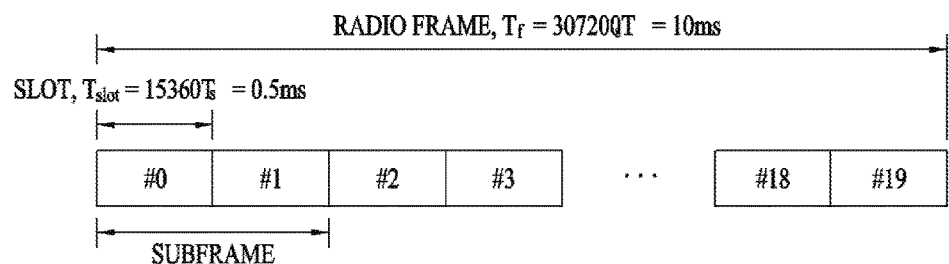
FIG. 4 is a diagram illustrating a structure of a radio frame used in an LTE system.

FIG. 4 is a diagram for a structure of a radio frame used in an LTE system.

Referring to FIG. 4, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_s$ indicates a sampling time and is represented as $T_s=1/(15 \text{ kHz } 2048)=3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
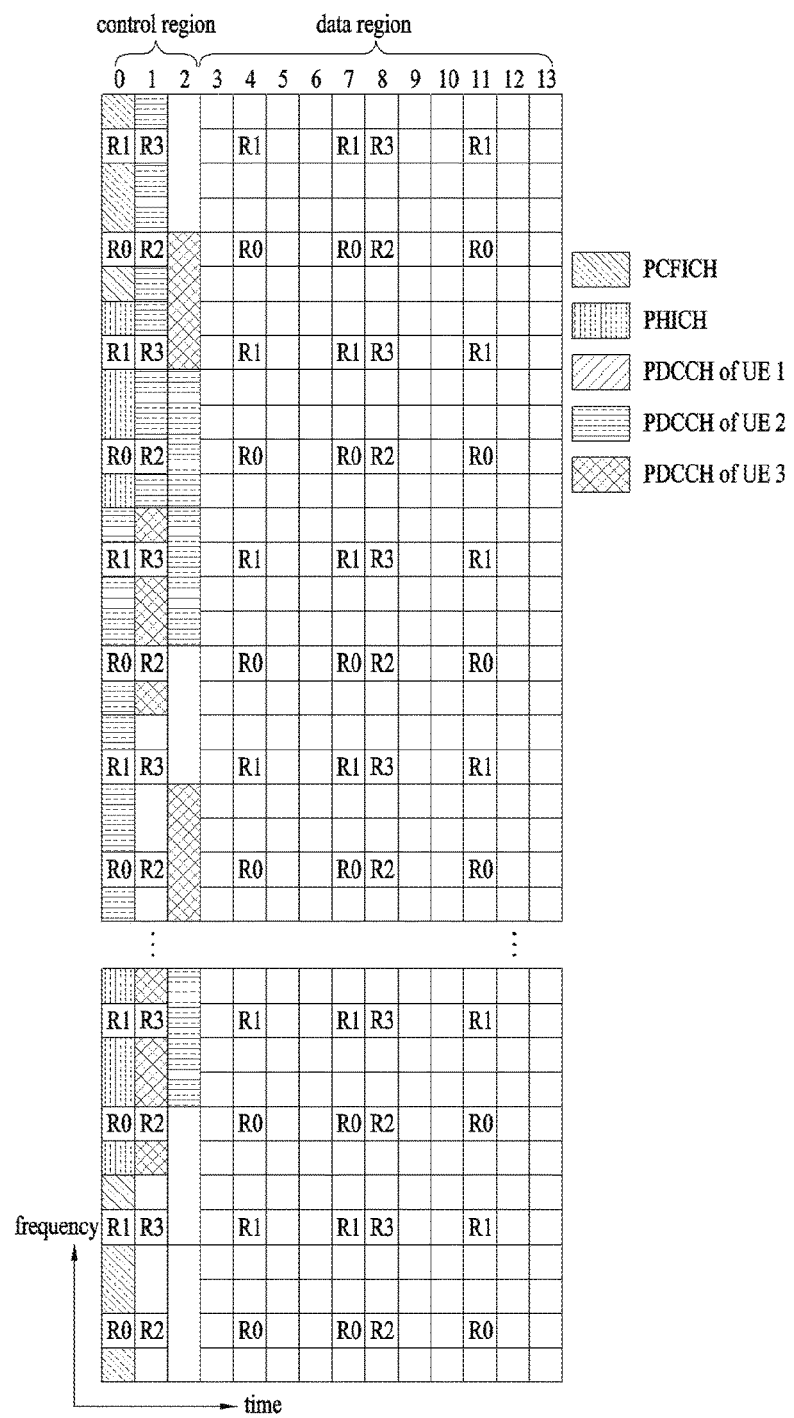
FIG. 5 is a diagram illustrating a structure of a downlink radio frame used in an LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
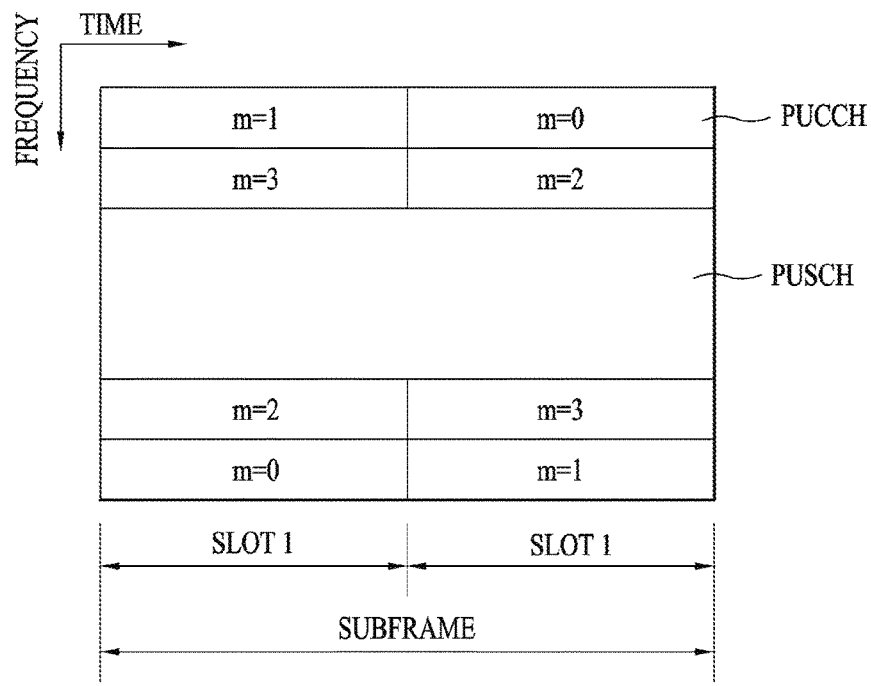
FIG. 6 is a diagram illustrating a structure of an uplink subframe used in an LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

Figure 7:
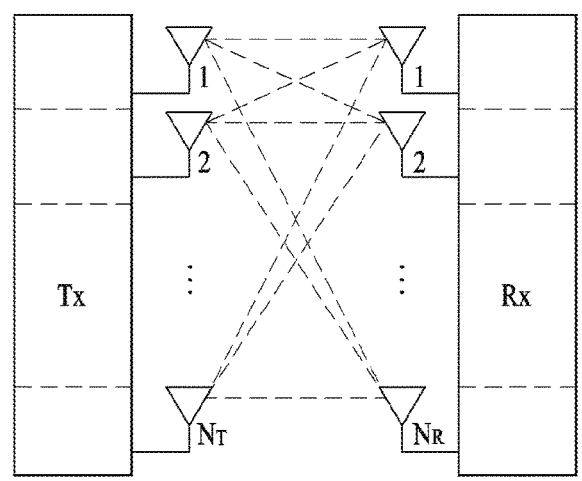
FIG. 7 is a diagram for a configuration of a general multi antenna (MIMO) communication system.

A block diagram of a general multi-antenna (MIMO) communication system is depicted in FIG. 7. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as Ro in case of using a single antenna, the transfer rate using multiple antennas can be theoretically increased as much as the maximum transfer rate Ro multiplied by a rate of increase Ri, as shown in the following Equation 1. In this case, the Ri is a smaller value among the $N_T$ and the $N_R$.

$$R_i = \min(N_T, N_R) \qquad \text{[Equation 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a 3rd generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Equation 2.

$$s = [s_1, s_2, \ldots, s_{N_T}]^T \qquad \text{[Equation 2]}$$

Meanwhile, for each of the transmission information $s_1$, $s_2$, ..., $s_{N_T}$, a transmit power may be differentiated according to the each of the transmission information. In this case, if each of the transmit powers is represented as $P_1$, $P_2$, ..., $P_{N_T}$, transmit power-adjusted transmission information can be represented as a vector in the following Equation 3.

$$\hat{s} = [\hat{s}_1, \hat{s}_2, \ldots, \hat{s}_{N_T}]^T = [P_1 s_1, P_2 s_1, \ldots, P_{N_T} s_{N_T}]^T \qquad \text{[Equation 3]}$$

And, if $\hat{s}$ is represented using a diagonal matrix P, it can be represented as a following Equation 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, let's consider a case that the $N_T$ number of transmission signal $x_1, x_2, \ldots, x_{N_T}$, which is practically transmitted, is configured in a manner of applying a weighted matrix W to the adjusted information vector $\hat{s}$. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Equation 5. In this case, $W_{ij}$ means a weighting between an $i^{th}$ transmitting antenna and $j^{th}$ information. The W is called the weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 5]}$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Equation 6.

$$\text{rank}(H) \leq \min(N_T, N_R) \qquad \text{[Equation 6]}$$

And, let's define each of the information different from each other, which are transmitted using a multi-antenna technology, as a 'transport stream' or simply a 'stream'. The 'stream' can be named a 'layer'. Then, the number of the transport stream is naturally configured not to be greater than the rank of the channel, which is a maximum number capable of transmitting information different from each other. Hence, the channel matrix H can be represented as Equation 7 in the following.

$$\text{\# of streams} \leq \text{rank}(H) \leq \min(N_T, N_R) \qquad \text{[Equation 7]}$$

In this case, '# of streams' indicates the number of streams. Meanwhile, in this case, it should be cautious that one stream can be transmitted via more than one antenna.

Various methods for making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

In the following, CSI (channel state information) reporting is explained.

In current LTE standard, there exist two transmission schemes including open loop MIMO which is managed without channel information and closed loop MIMO which is managed based on channel information. In the closed loop MIMO, each of an eNB and a UE performs beamforming based on channel information to obtain a multiplexing gain of MIMO antenna. In order to obtain CSI from the UE, the eNB transmits a reference signal to the UE and commands the UE to feedback CSI measured based on the reference signal via PUCCH (physical uplink control channel) or PUSCH (physical uplink shared channel).

The CSI is mainly classified into RI, PMI, and CQI information. The RI (rank indicator) indicates rank information of a channel and the number of streams received by a UE through an identical frequency-time resource. Since the RI is dominantly determined by long term fading of a channel, the RI is fed back to the eNB from the UE with an interval longer than intervals of the PMI and the CQI in general.

The PMI (precoding matrix index) corresponds to a value to which a spatial characteristic of a channel is reflected. The PMI indicates a precoding matrix index of an eNB preferred by a UE on the basis of a metric such as SINR and the like. The CQI corresponds to a value indicating strength of a channel. In general, the CQI indicates reception SINR capable of being obtained when an eNB uses the PMI.

In the following, a reference signal is explained in more detail.

In general, in order to measure a channel, a reference signal already known to both a transmitting end and a receiving end is transmitted to the receiving end from the transmitting end together with data. The reference signal plays a role in performing a demodulation process by notifying not only channel measurement but also a modulation scheme. A reference signal is classified into a dedicated reference signal (DRS) for an eNB and a specific UE and a cell-specific reference signal or a common reference signal (common RS or cell-specific RS (CRS)). And, the cell-specific reference signal includes a reference signal for measuring CQI/PMI/RI and reporting the CQI/PMI/RI to an eNB. The reference signal is referred to as a CSI-RS (channel state information-RS).

Figure 8:
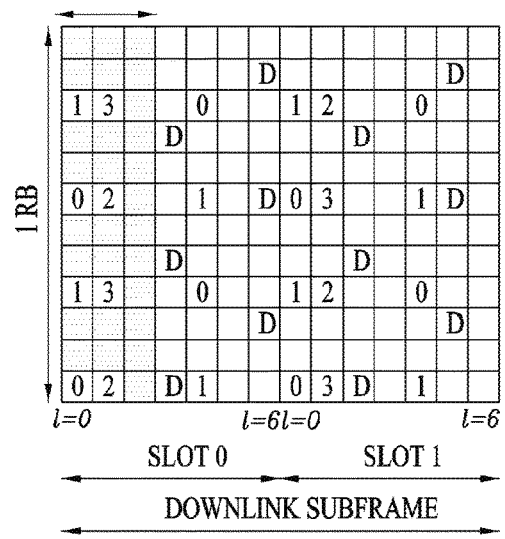
FIGS. 8 and 9 are diagrams for a structure of a downlink reference signal in LTE system supporting downlink transmission using 4 antennas.
Figure 9:
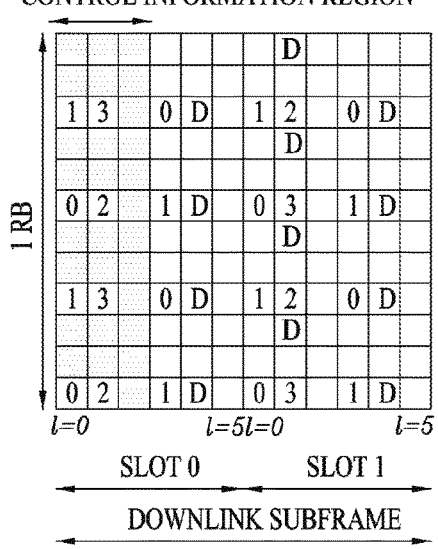

FIGS. 8 and 9 are diagrams for a structure of a downlink reference signal in LTE system supporting downlink transmission using 4 antennas. In particular, FIG. 8 shows a case of a normal cyclic prefix and FIG. 9 shows a case of an extended cyclic prefix.

Referring to FIGS. 8 and 9, 0 to 3 written on a grid corresponds to a CRS (common reference signal) which is a cell-specific reference signal transmitted to perform channel measurement and data demodulation in response to antenna ports 1 to 3. The cell-specific reference signal CRS can be transmitted to a UE not only over a data information region but also over a control information region.

And, 'D' written on a grid corresponds to a downlink DM-RS (demodulation-RS) which is a UE-specific RS and the DM-RS supports single antenna port transmission via a data region, i.e., PDSCH. Information on whether or not there exists the DM-RS corresponding to the UE-specific RS is signaled to a UE via higher layer. FIGS. 8 and 9 shows an example of a DM-RS corresponding to an antenna port 5. 3GPP standard document 36.211 also defines DM-RSs for antenna ports 7 to 14, i.e., 8 antenna ports in total.

Figure 10:
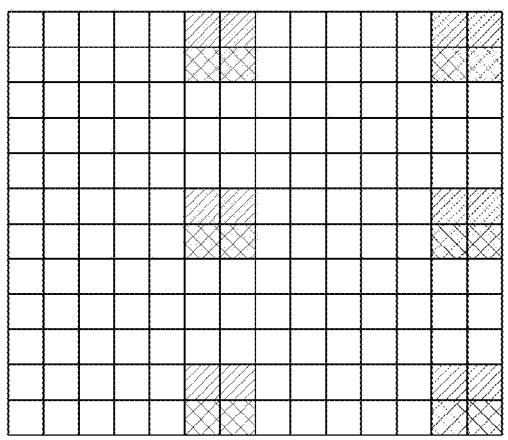
FIG. 10 is a diagram for an example of allocating a downlink DM-RS defined by current 3GPP standard document.

FIG. 10 is a diagram for an example of allocating a downlink DM-RS defined by current 3GPP standard document.

Referring to FIG. 10, DM-RSs corresponding to antenna ports {7, 8, 11, 13} are mapped to a DM-RS group 1 using a sequence per antenna port and DM-RSs corresponding to antenna ports {9, 10, 12, 14} are also mapped to a DM-RS group 2 using a sequence per antenna port.

Meanwhile, the aforementioned CSI-RS is proposed to measure a channel on PDSCH irrespective of a CRS. Unlike the CRS, the CSI-RS can be defined by maximum 32 different resource configurations to reduce ICI (inter-cell interference) in multi-cell environment.

Figure 11:
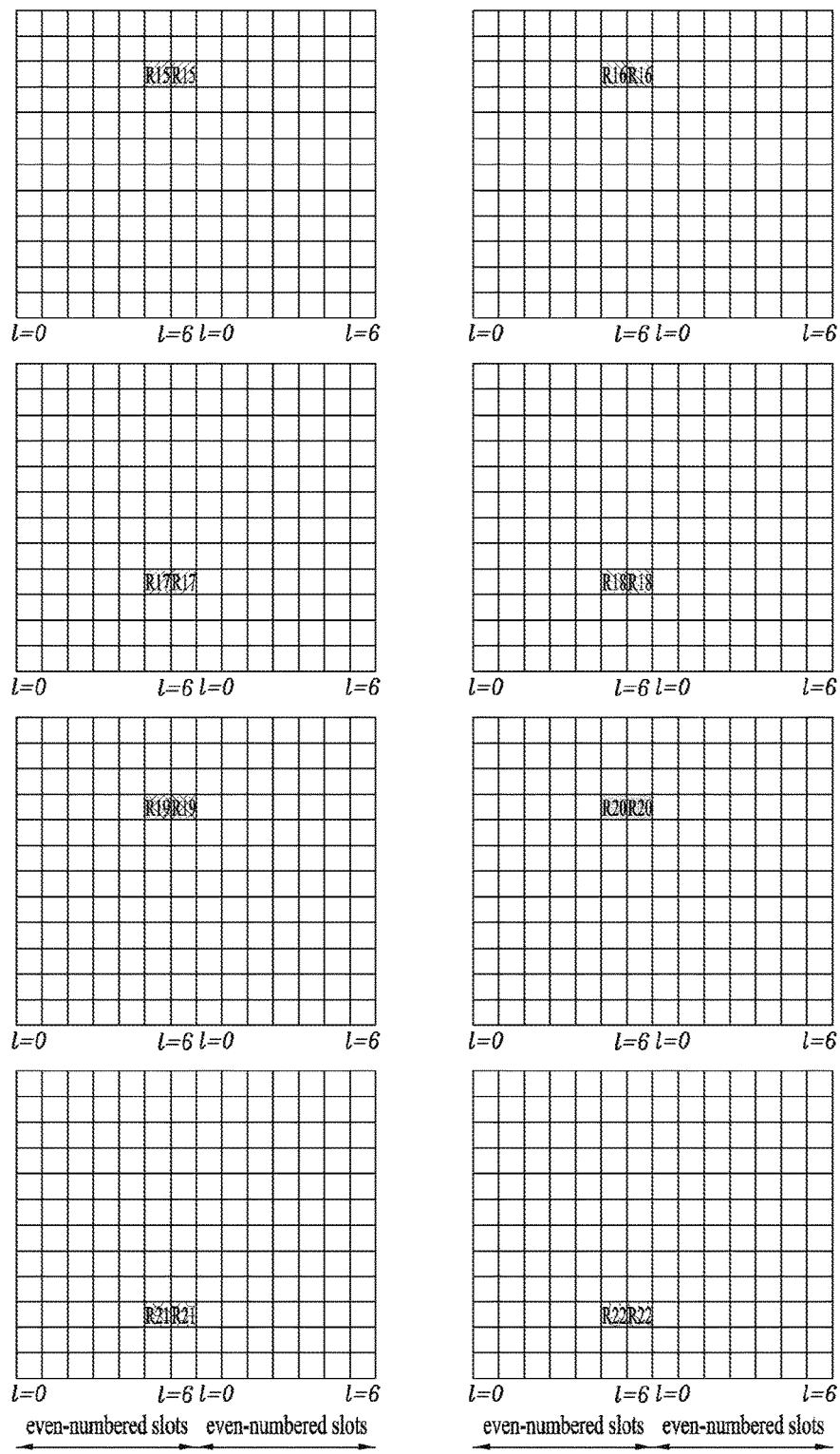
FIG. 11 is a diagram for an example of CSI-RS configuration #0 in case of a normal CP among downlink CSI-RS configurations defined in current 3GPP standard document.

A CSI-RS (resource) configuration varies according to the number of antenna ports and it is able to configure a CSI-RS defined by a different (resource) configuration to be transmitted between neighboring cells. Unlike the CRS, the CSI-RS supports up to maximum 8 antenna ports. According to 3GPP standard document, total 8 antenna ports (antenna ports 15 to 22) are assigned for the CSI-RS. FIG. 11 illustrates a CSI-RS configuration #0 in case of a normal CP among CSI-RS configurations defined by a current 3GPP standard document. And, it may be able to define a CSI-RS subframe configuration and the CSI-RS subframe configuration consists of a period ($T_{CSI-RS}$) represented by a subframe unit and a subframe offset ($\Delta_{CSI-RS}$).

Information on a ZP (zero-power) CSI-RS is transmitted via an RRC layer signal in a manner of being included in a CSI-RS-Config-r10 message. In particular, a ZP CSI-RS resource configuration consists of zeroTxPowerSubframe-Config-r10 and zeroTxPowerResourceConfigList-r10 corresponding to a bitmap of a size of 16 bits. In this case, the zeroTxPowerSubframeConfig-r10 indicates a period of transmitting the ZP CSI-RS and a subframe offset via $I_{CSI-RS}$ value. And, the zeroTxPowerResourceConfigList-r10 corresponds to information for indicating ZP CSI-RS configuration. Each element of the bitmap indicates configurations that the number of antenna ports for a CSI-RS corresponds to 4. In particular, according to a current 3GPP standard document, a ZP CSI-RS is defined for a case that the number of antenna ports for a CSI-RS corresponds to 4 only.

Meanwhile, an operation for calculating CQI via interference measurement is explained in the following.

It is necessary for a UE to calculate SINR as a factor necessary for calculating a CQI. In this case, reception power measurement (S-measure) of a desired signal can be performed using such an RS as an NZP CSI-RS and the like. In order to measure interference power (I-measure or IM (interference measurement)), power of an interference signal can be measured by eliminating the desired signal from the received signal.

Subframe sets $C_{CSI,0}$ and $C_{CSI,1}$ for measuring CSI can be signaled via higher layer signaling. A subframe corresponding to each of the subframe sets is included in a single set only without being overlapped with each other. In this case, a UE can perform the S-measure via such an RS as a CSI-RS without being restricted by a special subframe. Yet, in case of performing the I-measure, the UE individually performs the I-measure according to $C_{CSI,0}$ and $C_{CSI,1}$ to calculate two different CQIs for the $C_{CSI,0}$ and the $C_{CSI,1}$.

Figure 12:
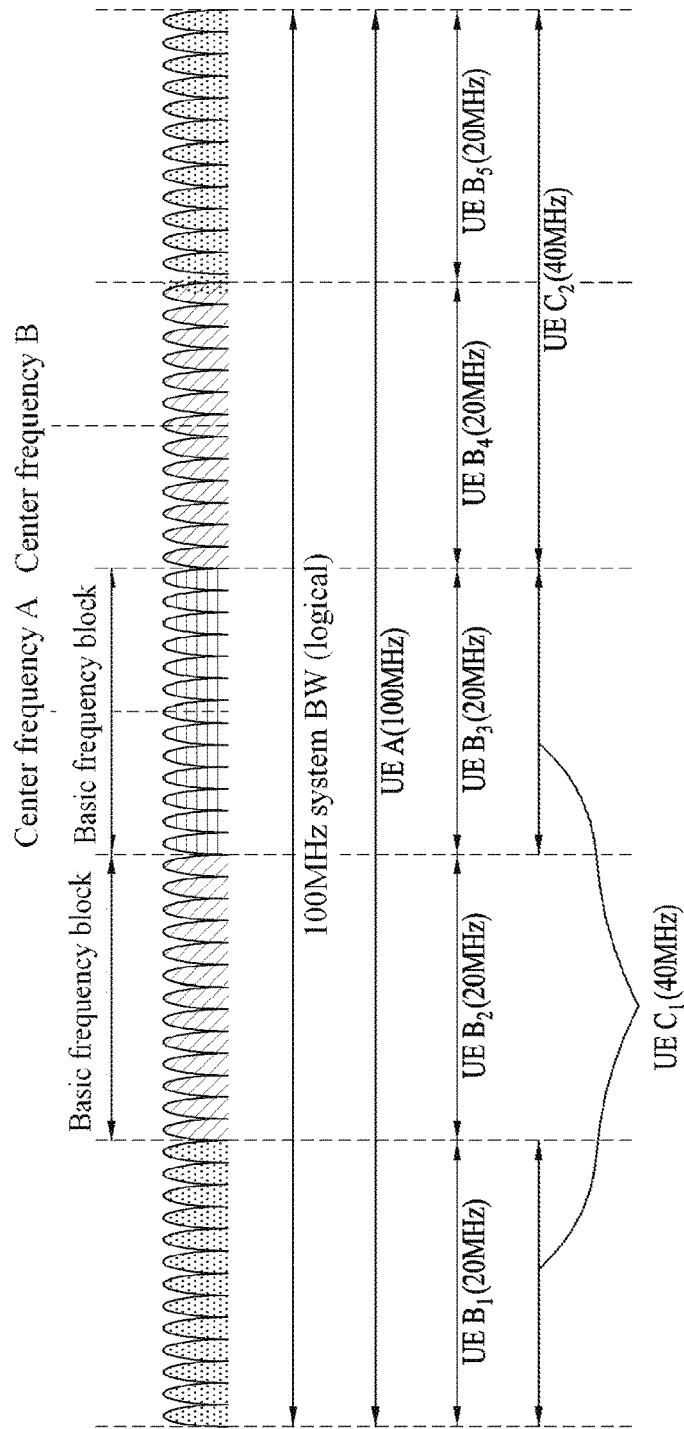
FIG. 12 is a conceptual diagram for explaining carrier aggregation.

In the following, a carrier aggregation scheme is described. FIG. 12 is a conceptual diagram for explaining carrier aggregation.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' is consistently used.

Referring to FIG. 12, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 12 illustrates the case in which component carriers have the same bandwidth, the case is purely exemplary, and thus, the component carriers may have different bandwidths. In addition, although FIG. 12 illustrates the case in which the component carriers are adjacent to each other in the frequency domain, FIG. 12 are logically illustrated, and thus, the component carriers may be physically adjacent to each other or may be spaced apart from each other.

Component carriers can use different center frequencies or use one common center frequency with respect to physically adjacent component carriers. For example, in FIG. 12, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 8. A downlink component carrier or a combination of the downlink component carrier and an uplink component carrier corresponding to the downlink component carrier may be referred to as a cell. A corresponding relation between a downlink component carrier and an uplink component carrier can be indicated via system information.

In this case, a method for scheduling a data channel by a control channel may be classified into a linked carrier scheduling method and a cross carrier scheduling method.

More specifically, in the linked carrier scheduling method, a control channel transmitted through a specific component carrier schedules only a data channel through the specific component carrier like in a legacy LTE system using a single component carrier. In particular, a downlink grant/uplink grant transmitted to PDCCH region of a downlink component carrier of the specific component carrier (or specific cell) can schedule only PDSCH/PUSCH of a cell to which the downlink component carrier belongs thereto. In particular, a search space corresponding to a region for attempting to detect the downlink grant/uplink grant exists at a PDCCH region of a cell at which PDSCH/PUSCH corresponding to a scheduling target is located.

Meanwhile, in the cross carrier scheduling method, a control channel transmitted through a primary component carrier (primary CC) using a carrier indicator field (CIF) schedules a data channel transmitted through the primary CC or a different CC. In other word, in the cross carrier scheduling method, a monitored cell (or a monitored CC) is set and a downlink grant/uplink grant transmitted in PDCCH region of the monitored cell schedules PDSCH/PUSCH of a cell configured to be scheduled in the cell. In particular, a search space for a plurality of component carriers exists at PDCCH region of the monitored cell. The Pcell is set among a plurality of the cells to transmit system information, attempt initial access, and transmit uplink control information. The Pcell includes downlink primary component carrier and an uplink primary component carrier corresponding to the downlink primary component carrier.

In the following, a method of transmitting and receiving a signal through an unlicensed band is explained.

Figure 13:
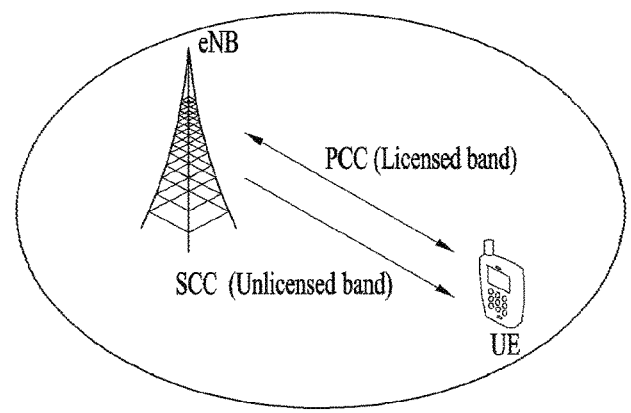
FIG. 13 is a diagram for an example of a carrier aggregation situation of a licensed band and an unlicensed band.

FIG. 13 is a diagram for an example of a carrier aggregation situation of a licensed band and an unlicensed band.

Referring to FIG. 13, an eNB can transmit a signal to a UE or the UE can transmit a signal to the eNB in a carrier aggregation situation of an LTE-A band corresponding to a licensed band and an unlicensed band. In the following description, for clarity, assume that the UE is configured to perform wireless communication through two component carriers in the licensed band and the unlicensed band, respectively. In this case, a carrier of the licensed band corresponds to a primary component carrier (primary CC (PCC) or Pcell) and a carrier of the unlicensed band corresponds to a secondary component carrier (secondary CC (SCC) or Scell). Yet, methods proposed by the present invention can also be extensively applied to a situation that a plurality of licensed bands and a plurality of unlicensed bands are used via carrier aggregation scheme. And, the methods can also be applied to a case that a signal is transceived between an eNB and a UE via an unlicensed band only.

If a structure of a reference signal used for transmitting PDSCH in current LTE system is used in an unlicensed band as it is, performance can be degraded. This is because not only LTE system but also a system of a different type such as WiFi or Bluetooth may exist in the unlicensed band and the LTE system should transmit and receive a signal via channel contention with the various systems. In general, although dispersive channel contention is used, it is impossible to perfectly prevent a resource collision which is occurred when two transmitting ends transmit a signal at the same time. Hence, a transmission signal of a system may have strong interference from a transmission signal of another system with at least a constant probability.

In particular, LTE system basically performs resource allocation in a unit of a subframe of 1 ms length as a minimum unit of the resource allocation, whereas WiFi or Bluetooth frequently transmits a signal of a length much shorter than the minimum unit. Hence, PDSCH, which is transmitted in a unit of subframe of 1 ms in an unlicensed band, experiences strong interference in a specific OFDM symbol only. On the contrary, the PDSCH may frequently experiences low interference in other OFDM symbols.

Figure 14:
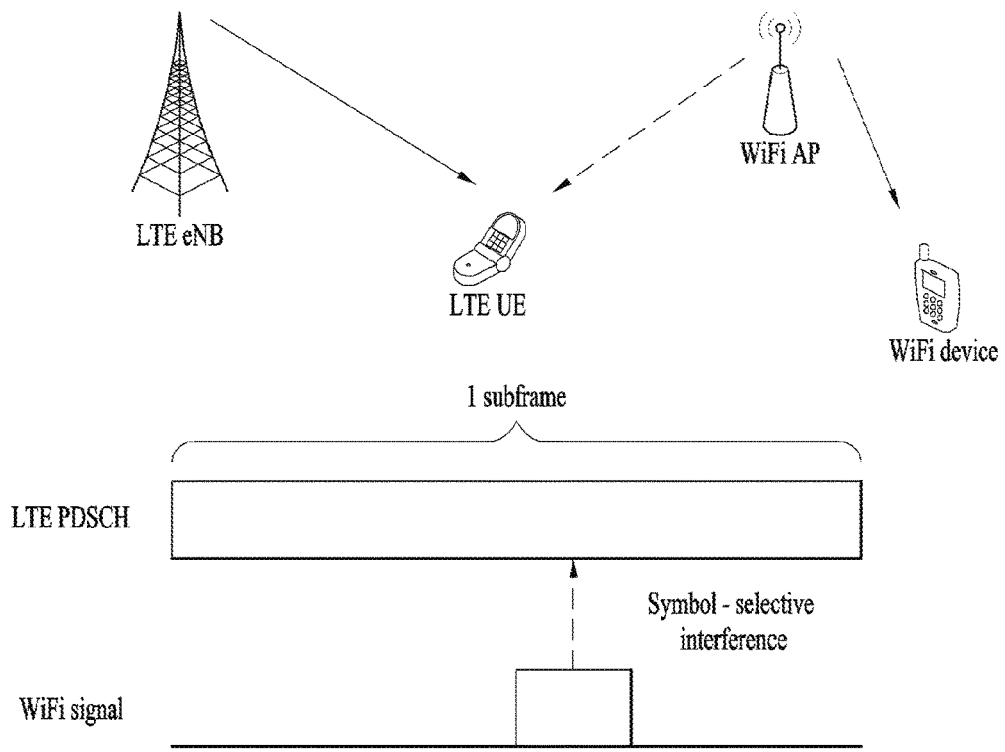
FIG. 14 is a diagram for an example that symbol-level interference occurs in an unlicensed band.

FIG. 14 is a diagram for an example that symbol-level interference occurs in an unlicensed band.

Referring to FIG. 14, it is able to see that symbol-level interference gives strong interference to a specific symbol only. If reference signals are concentrated to the specific symbol, channel estimation capability for decoding PDSCH can be considerably deteriorated. Although interference from a different symbol is not strong, it is highly probable that PDSCH decoding is to be failed. Regarding this, it shall be described in the following with reference to the drawing.

Figure 15:
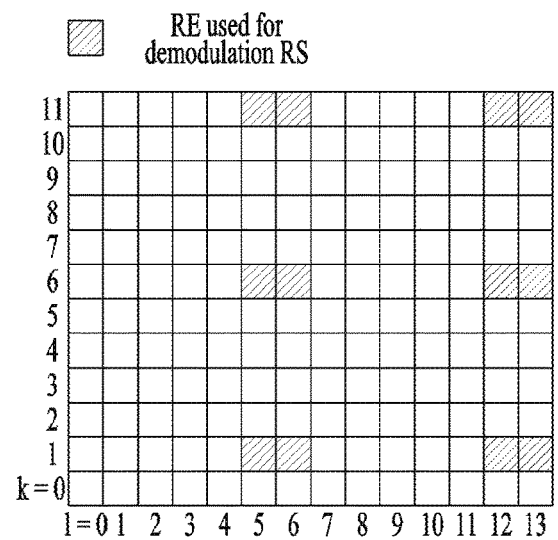
FIGS. 15 and 16 are diagrams for an example of a DM-RS structure for PDSCH in legacy LTE system.
Figure 16:
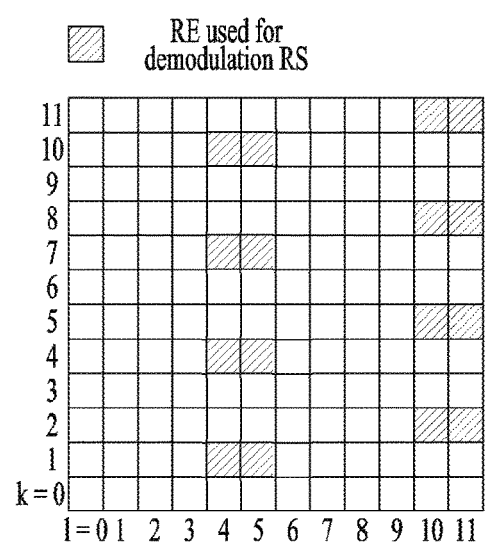

FIGS. 15 and 16 are diagrams for an example of a DM-RS structure for PDSCH in legacy LTE system. In particular, FIG. 15 illustrates a case that a normal CP is applied and FIG. 16 illustrates a case that an extended CP is applied.

Referring to FIGS. 15 and 16, it is able to see that REs to which a DM-RS is mapped are concentrated to a specific symbol. For example, referring to FIG. 15, REs to which a DM-RS is mapped are located at OFDM symbols #5, #6, #12, and #13 only. Referring to FIG. 16, REs to which a DM-RS is mapped are located at OFDM symbols #4, #5, #10, and #11 only. Hence, if the aforementioned symbol-level interference is applied to the symbols, it is highly probable that decoding of PDSCH is to be failed due to the deterioration of the channel estimation capability.

Figure 17:
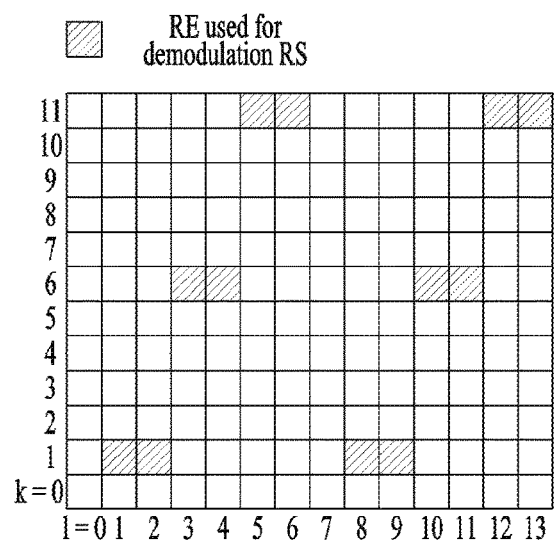
FIGS. 17 and 18 are diagrams for an example of moving a DM-RS RE according to embodiment of the present invention to reduce a problem due to symbol-level interference in an unlicensed band.
Figure 18:
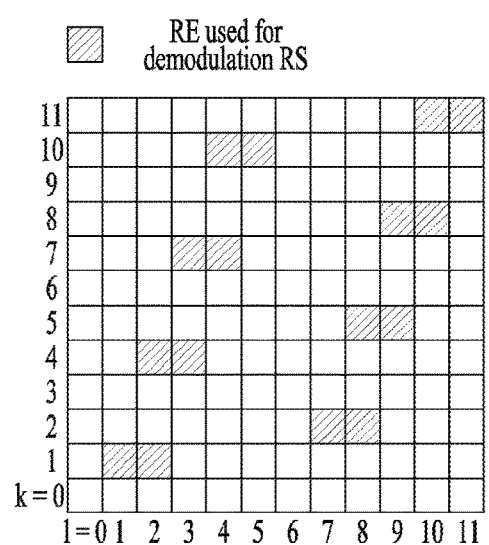

The aforementioned problem can be solved by moving a DM-RS RE located at a different subcarrier on an identical symbol to a different symbol position. FIGS. 17 and 18 are diagrams for an example of moving a DM-RS RE according to embodiment of the present invention to reduce a problem due to symbol-level interference in an unlicensed band.

In particular, FIG. 17 illustrates a case of moving a DM-RS in case of the normal CP mentioned earlier in FIG. 15. In this case, an RE on a subcarrier #6 and an RE on a subcarrier #1 move forward as many as two symbols and four symbols, respectively. FIG. 18 illustrates a case of moving a DM-RS in case of the extended CP mentioned earlier in FIG. 16. In this case, DM-RS on subcarriers #7 and #8, DM-RS on subcarriers #4 and #5, and DM-RS on subcarriers #1 and #2 move forward as many as one symbol, two symbols and three symbols, respectively. If the aforementioned process is performed, although symbol-level interference occurs, an impact of the symbol-level interference is restricted to a partial RS RE only. Hence, it may be able to secure channel estimation capability of an appropriate level. Of course, the position of the DM-RS RE shown in FIGS. 17 and 18 is just an example only. The number of DM-RS REs located on an identical symbol can be reduced by moving a DM-RS RE in various ways.

In FIGS. 15 to 18, it is assumed a case that a rank of PDSCH corresponds to 1 to 2. If PDSCH has a rank greater than 2, an RE located at a subcarrier immediately below of the RE shown in the drawing can be additionally used as a DM-RS.

However, movement of a DM-RS RE mentioned earlier in FIGS. 17 and 18 has a problem that the DM-RS may be collided with a different signal, i.e., a CRS. In order to avoid the collision, it may move a DM-RS RE in a subframe in which a CRS is not transmitted and a legacy DM-RS RE position can be maintained in a subframe in which a CRS is transmitted.

Figure 19:
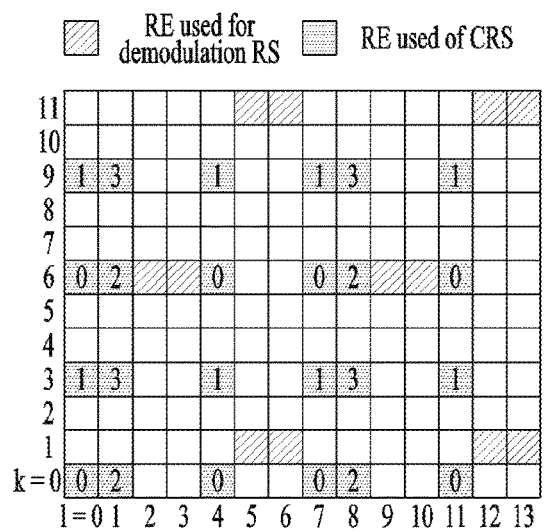
FIG. 19 is a diagram for a different example of moving a DM-RS RE according to embodiment of the present invention.

Or, it may be able to design that a DM-RS RE is located at a symbol only in which a CRS is not transmitted. FIG. 19 is a diagram for a different example of moving a DM-RS RE according to embodiment of the present invention. Referring to FIG. 19, only OFDM symbols #2, #3, #9 and #10 are additionally used as a DM-RS RE.

Of course, in case of FIG. 19, it may have a problem that the number of RSs varies according to a symbol. In order to solve the problem, it may increase density of a DM-RS.

Figure 20:
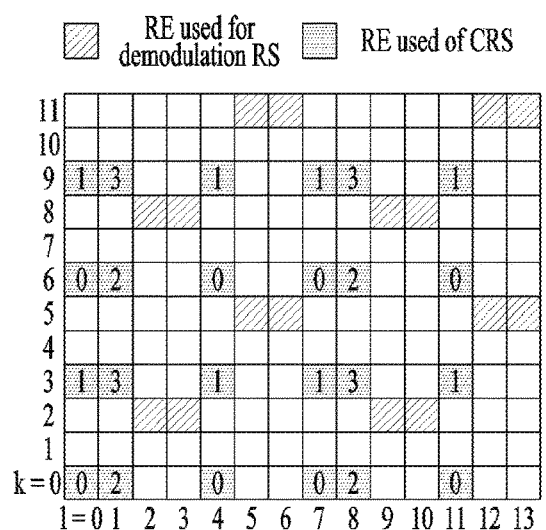
FIG. 20 is a diagram for an example of increasing density of DM-RS according to embodiment of the present invention.

FIG. 20 is a diagram for an example of increasing density of DM-RS according to embodiment of the present invention. In particular, an RS pattern shown in FIG. 20 can be helpful for increasing demodulation capability in an unlicensed band where interference situation is not guaranteed in spite of increased overhead.

Figure 21:
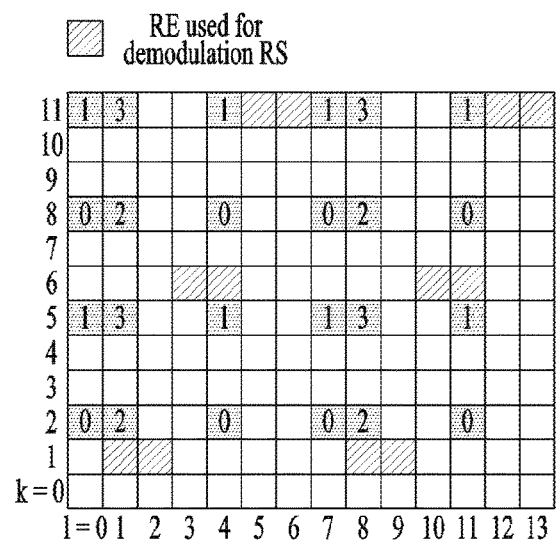
FIG. 21 is a diagram for an example that a frequency shift value of CRS is fixed according to embodiment of the present invention.

Although a DM-RS RE of which a symbol has moved and a CRS are transmitted at the same symbol, it may be able to prevent a collision between the DM-RS RE and the CRS using v-shift, i.e., frequency shift. FIG. 21 is a diagram for an example that a frequency shift value of CRS is fixed according to embodiment of the present invention.

Referring to FIG. 21, the DM-RS RE uses the structure mentioned earlier in FIG. 17 and v-shift applied to the CRS, i.e., a frequency shift value is fixed. By doing so, although the DM-RS and the CRS are transmitted at the same symbol, it may prevent collision with the CRS.

Or, frequency shift can also be performed on a frequency position of a DM-RS together with a CRS. For example, if a position of a CRS RE moves to the bottom as much as a subcarrier in the operation of FIG. 21, it may also be able to make a DM-RS move to the bottom as much as a subcarrier.

Meanwhile, a legacy DM-RS has a structure that an RS of a single antenna port is spread to a specific code in two adjacent symbols. The structure has a merit in that energy of the two symbols are combined and an RS can be transmitted with the higher energy. Yet, if symbol-level interference occurs in an unlicensed band, although strong interference occurs on a single RS symbol only, a despreading problem occurs on the RS code and it is unable to utilize RS of the remaining symbols. In order to solve the problem, an operation that RS of each antenna port is spread to a specific code can be omitted in an unlicensed band. Specifically, a DM-RS of a single antenna port is transmitted in one symbol only among the two adjacent symbols. As a different meaning, a code for spreading a DM-RS may correspond to a code consisting of one 1 and a plurality of 0s. Yet, in order to provide an eNB with a right of selecting an operation from among the operation proposed by the present invention and a legacy operation in an unlicensed band, the eNB can inform a UE of information on whether or not a DM-RS of a single antenna port is spread to a plurality of symbols via higher layer signaling.

As mentioned in the foregoing description, if an RS is not spread to time axis in an unlicensed band, a restriction that a DM-RS is transmitted via the same subcarrier in two adjacent symbols is not necessary. Hence, it may be able to more freely arrange DM-RS REs.

Figure 22:
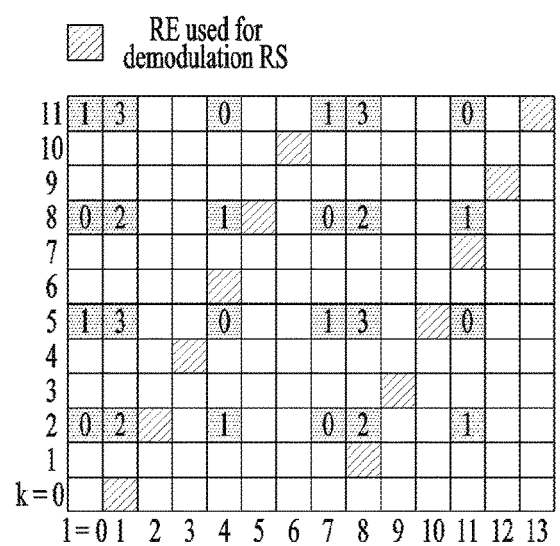
FIG. 22 is a diagram for an example of arranging DM-RS RE according to embodiment of the present invention.

FIG. 22 is a diagram for an example of arranging DM-RS RE according to embodiment of the present invention Referring to FIG. 22, overhead of DM-RS is maintained in a manner of being identical to the legacy scheme. DM-RS REs are arranged at subcarriers of position as different as possible. The DM-RS REs are arranged in a form that the whole of PRB is covered by a slot.

Of course, DM-RS REs actually used by each antenna can be reduced compared to the example of FIG. 22. For example, in case of an antenna port #7, it may use REs located at first, third, and fifth RS symbols. In case of an antenna port #8, it may use REs located at second, fourth, and sixth RS symbols. Of course, frequency shift can also be performed on a DM-RS RE according to frequency shift of a CRS to avoid collision with the CRS.

In the following, interference measurement in an unlicensed band via CSI-IM (interference measurement) is explained. The CSI-IM is explained before the present invention is explained.

Figures 23, 24:
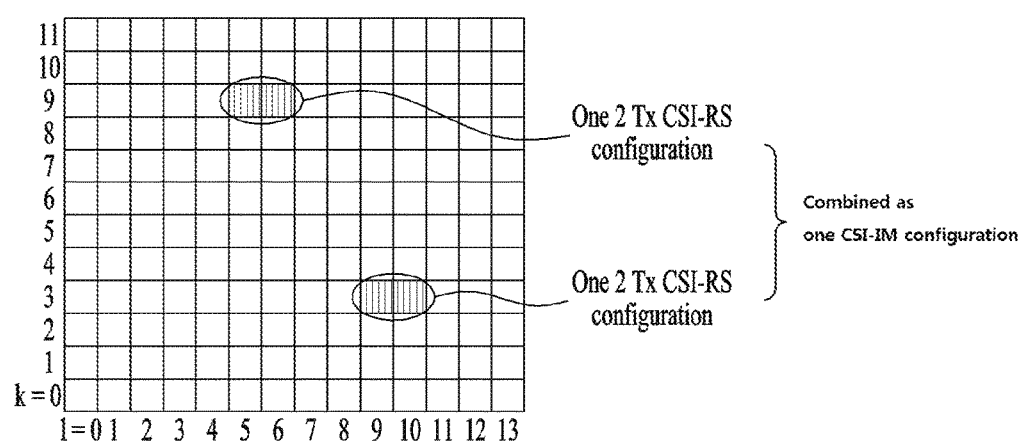
FIG. 23 is a diagram for an example of CSI-RS configuration of a current LTE system.
FIG. 24 is a diagram for CSI-IM in an unlicensed band according to embodiment of the present invention.

FIG. 23 is a diagram for an example of CSI-RS configuration of a current LTE system. In particular, FIG. 23 illustrates 8 Tx CSI-RS configuration. The 8 Tx CSI-RS configuration is defined by 8 REs each of which is represented by the same grid.

Referring to FIG. 23, one 8 Tx CSI-RS configuration consists of two 4 Tx CSI-RS configurations. 4 REs for CSI-RS antenna port index #0 to #3 are included in one 4 Tx CSI-RS configuration and 4 REs for CSI-RS antenna port index #4 to #7 are included in another 4 Tx CSI-RS configuration. One 4 Tx CSI-RS configuration consists of two 2 Tx CSI-RS configurations. Two REs such as CSI-RS antenna port index #0 and #1 located at the same subcarrier are included in one 2 Tx CSI-RS configuration.

Meanwhile, a UE supporting CoMP (coordinated multipoint) transmission in LTE system measures interference from CSI-IM to calculate CSI. An eNB designates a position of CSI-IM to be used for a specific CSI process. According to the current LTE system, a CSI-IM uses REs configured by one 4 Tx CSI-RS configuration. Yet, as shown in FIG. 24, 4 REs constructing one 4 Tx CSI-RS configuration are located at two contiguous symbols and occupy two subcarriers in a symbol.

When operating in an unlicensed band, if symbol-level interference occurs, interference does not occur on most of symbols of a specific subframe, whereas interference may occur on a symbol including CSI-IM only. In this case, a UE considers that strong interference exists in the entire subframe and reports very low CSI. Hence, it may be difficult to perform a correct link adaptation operation.

The aforementioned problem can be solved by arranging REs constructing one CSI-IM to a different OFDM symbol. As an example, preferably, an eNB designates two 2 Tx CSI-RS configurations located at a different OFDM symbol and may use 4 REs covered by the two CSI-RS configurations as one CSI-IM.

FIG. 24 is a diagram for CSI-IM in an unlicensed band according to embodiment of the present invention. Referring to FIG. 24, 4 REs covered by two 2 Tx CSI-RS configurations are defined as one CSI-IM.

And, since it is necessary to exclude a signal of a serving cell from interference measurement, it is necessary to make PDSCH not to be mapped to a CSI-IM RE. To this end, it is necessary to set a ZP (zero power) CSI-RS configuration in order not to map PDSCH to a position of a new CSI-IM RE. Similar to CSI-IM, since it is able to designate a legacy ZP CSI-RS configuration in a unit of 4 Tx CSI-RS configuration, it is able to extensively designate the legacy ZP CSI-RS configuration in a unit of 2 Tx CSI-RS configuration.

Or, in order to perform the operation mentioned earlier in FIG. 24, it may be able to define a new 4 Tx CSI-RS configuration having a position identical to two REs of the legacy 2 Tx CSI-RS configuration and may be then able to configure CSI-IM based on the new 4 Tx CSI-RS configuration.

Of course, in order to more precisely reflect an interference situation varying in an unlicensed band in the aforementioned principle, it may be able to increase the number of REs of CSI-IM. As an example, three or more 2 Tx CSI-RS configurations can be combined with each other to configure one CSI-IM.

The new CSI-RS configuration, which is introduced for the CSI-IM and the ZP CSI-RS, is also applied to NZP CSI-RS configuration for measuring a channel part in CSI to more reliably measure CSI in symbol-level interference environment.

According to the aforementioned principle, it may be able to increase density of a CRS in an unlicensed band as well. In particular, a CRS is reliably transmitted in a licensed band all the time, whereas the CRS is discontinuously transmitted in an unlicensed band. In general, a UE assumes reliable CRS transmission in the licensed band and performs channel estimation with higher capability by appropriately combining CRSs existing in a plurality of subframes with each other. In order to obtain channel estimation capability similar to channel estimation capability in the licensed band in the unlicensed band on which a CRS is discontinuously transmitted, the increase of the density of the CRS can also be helpful for obtaining the capability. In the following, a method of increasing density of a CRS for an operation on an unlicensed band is explained.

First of all, an RE position of a CRS is determined by a cell identifier. In an unlicensed band, it may be able to additionally use an RE of a position generated by an identifier rather than an identifier of a cell in which a CRS is transmitted. Specifically, a cell using a cell identifier X transmits a CRS at a position determined by the cell identifier X and may also be able to transmit a CRS at a position determined by a cell identifier X+a (e.g., a=1). Specifically, it may be able to regulate the number of antenna ports to be identical to each other in two CRS positions and a CRS sequence can also be derived from the cell identifier X. Hence, although an RE identical to the cell identifier X+a is used, it may be able to distinguish RSs from each other through a different sequence.

Figure 25:
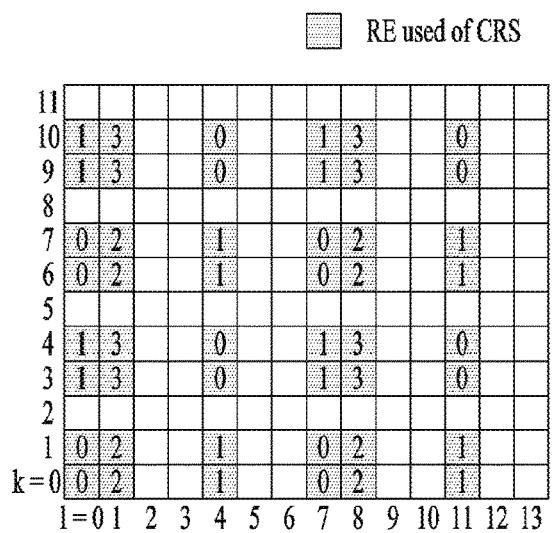
FIG. 25 is a diagram for an example of increasing density of CRS in an unlicensed band according to embodiment of the present invention.

FIG. 25 is a diagram for an example of increasing density of CRS in an unlicensed band according to embodiment of the present invention. Referring to FIG. 25, it is able to see that an original cell identifier additionally utilizes a CRS RE of which frequency shift is 1 in a cell that frequency shift is 0.

Or, the increase of the RS RE density can be applied to a partial symbol only. In particular, if the increase of the density is applied to a symbol positioned at the fore part of a subframe only, it may perform reliable channel estimation at the fore part of the symbol, which is unable to guarantee CRS transmission in a previous subframe, using the extended CRS RE. On the contrary, a symbol positioned at the latter part, which is able to use a CRS of a fore part CRS, does not increase CRS RE to reduce RS overhead.

Figure 26:
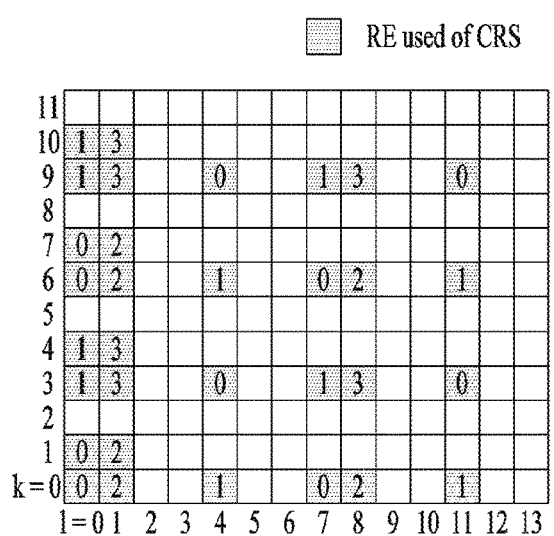
FIGS. 26 and 27 are diagrams for different examples of increasing density of CRS in an unlicensed band according to embodiment of the present invention.
Figure 27:
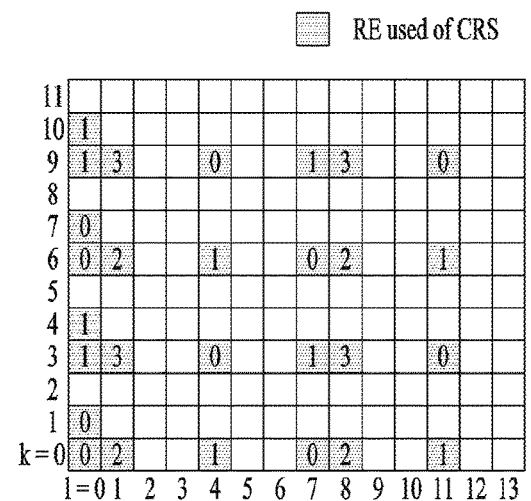

FIGS. 26 and 27 are diagrams for different examples of increasing density of CRS in an unlicensed band according to embodiment of the present invention. Specifically, referring to FIG. 26, RS overhead can be increased at the first two symbols only. Referring to FIG. 27, RS overhead can be increased at the first symbol only. Of course, for example, RS overhead can be increased in a slot unit instead of a symbol unit. For example, RS overhead can be increased in the whole of the first slot.

As a further different method of increasing density of a CRS, it may be able to utilize a CRS structure of 4 antenna ports in a situation that the number of CRS antenna ports is set to 2. This method has a merit in that a new CRS RE position is not introduced. However, it is unable to use 4 antenna port CRS configuration in a subframe of which at least CRS density is increased in an unlicensed band.

In some cases, the increase of the CRS density can be performed in a partial subframe only. If an eNB configures 4 antenna port CRS, it may instantaneously operate with 2 antenna port CRS while following the proposed method in a subframe where the increase of the CRS density is required. It may operate with 4 antenna port CRS again in the rest of subframes. If the aforementioned method is used, channel estimation is performed in a manner that an antenna port (0, 1) and an antenna port (2, 3) are considered as an identical antenna port. In this case, although it is able to consider an antenna port (0, 2) and an antenna port (1, 3) which are transmitted through the same subcarrier as an identical antenna port, antenna ports (0, 3) and (1, 2) can be considered as an identical antenna port to diversify a transmission subcarrier of an identical antenna port.

As mentioned in the foregoing description, an operation of increasing density of a CRS may restrictively appear in a partial subframe only. In particular, since the density of the CRS is increased due to the discontinuous transmission of the CRS, it may be able to selectively increase the density of the CRS near a start timing only at which an eNB starts a series of transmission (hereinafter, Tx burst).

As an example, CRS may increase at a partial subframe only of a fore part of Tx burst. Specifically, it may be able to configure a CRS to be increased in a first subframe only of Tx burst.

As a different example, the density of the CRS may selectively increase only when a length of a subframe is reduced. When an eNB always transmits a subframe of an intact length in an unlicensed band, if a channel is used at a subframe boundary and the channel is switched to an idle state thereafter, the eNB is unable to occupy the channel and loses a channel access opportunity by a different device. In order to solve the problem, if a channel is idle after a timing of a subframe boundary, it may be able to configure the eNB to start transmission and a start timing of a next subframe can be configured to keep a previously defined subframe boundary. In this case, if transmission starts in the middle of a subframe, a length of the subframe is shorter than a length of a normal subframe. The subframe is referred to as a partial subframe.

In general, a partial subframe is positioned at the very first of Tx burst and a length of an entire subframe is reduced. Hence, a CRS itself belonging to the same subframe is reduced. By doing so, it may be able to selectively increase density of the CRS in the partial subframe only.

As mentioned in the foregoing description, if density of a CRS is changed according to a subframe, a UE can correctly perform data mapping only when the UE is able to identify the density of the CRS. To this end, an eNB can inform the UE of start timing and end timing of Tx burst and internal configuration of the Tx burst via separate signaling. Or, the eNB may transmit a predetermined special signal to the UE before the Tx burst or the partial subframe starts. The UE detects the signal to identify characteristics of a subframe and the density of the CRS.

Figure 28:
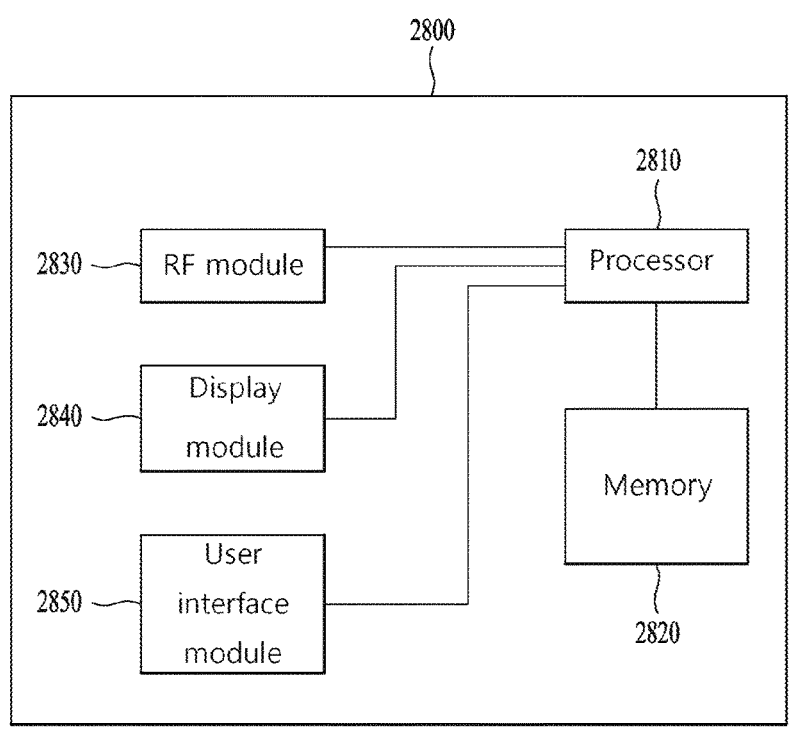
FIG. 28 is a block diagram for a communication device according to one embodiment of the present invention.

FIG. 28 is a block diagram for a communication device according to one embodiment of the present invention.

Referring to FIG. 28, a communication apparatus 2800 includes a processor 2810, a memory 2820, an RF module 2830, a display module 2840, and a User Interface (UI) module 2850.

The communication device 2800 is shown as having the configuration illustrated in FIG. 28, for the convenience of description. Some modules may be added to or omitted from the communication apparatus 2800. In addition, a module of the communication apparatus 2800 may be divided into more modules. The processor 2810 is configured to perform operations according to the embodiments of the present invention described before with reference to the drawings. Specifically, for detailed operations of the processor 2810, the descriptions of FIGS. 1 to 27 may be referred to.

The memory 2820 is connected to the processor 2810 and stores an Operating System (OS), applications, program codes, data, etc. The RF module 2830, which is connected to the processor 2810, upconverts a baseband signal to an RF signal or downconverts an RF signal to a baseband signal. For this purpose, the RF module 2830 performs digital-to-analog conversion, amplification, filtering, and frequency upconversion or performs these processes reversely. The display module 2840 is connected to the processor 2810 and displays various types of information. The display module 2840 may be configured as, not limited to, a known component such as a Liquid Crystal Display (LCD), a Light Emitting Diode (LED) display, and an Organic Light Emitting Diode (OLED) display. The UI module 2850 is connected to the processor 2810 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of allocating a resource for a control signal of direct device-to-device communication in a wireless communication system and an apparatus therefor are described with reference to examples applied to 3GPP LTE system, it may be applicable to various kinds of wireless communication systems as well as the 3GPP LTE system.

What is claimed is:

1. A method of reporting channel state information by a user equipment (UE) to an eNB in an unlicensed band in a wireless communication system, the method comprising:
receiving information on a first reference signal resource for interference measurement in the unlicensed band from the eNB through a higher layer;
calculating channel state information using the first reference signal resource for the interference measurement; and
reporting the channel state information to the eNB,
wherein the first reference signal resource for the interference measurement comprises a plurality of resource elements (REs),
wherein each of the plurality of REs is assigned to a different symbol,
wherein the information further includes a second reference signal resource for a cell-specific reference signal (CRS) in the unlicensed band, and
wherein the second reference signal resource is assigned to a CRS RE corresponding to a position to which a frequency shift is applied and a CRS RE whose position is defined by a cell identifier.

2. The method of claim 1, wherein the first reference signal resource is composed of 4 REs and each of the 4 REs is mapped to a different antenna port.

3. The method of claim 1, wherein the second reference signal resource is assigned to a CRS RE corresponding to a position to which a frequency shift is applied only in a specific symbol of a subframe.

4. The method of claim 3, wherein the specific symbol is a first symbol or first two symbols of the subframe.

5. A method of receiving channel state information by an eNB from a user equipment (UE) in an unlicensed band in a wireless communication system, the method comprising:
provides information on a first reference signal resource for interference measurement in the unlicensed band to the UE through a higher layer; and
receiving channel state information, which is calculated using the first reference signal resource for the interference measurement, from the UE,
wherein the first reference signal resource for the interference measurement comprises a plurality of resource elements (REs),
wherein each of the plurality of REs is assigned to a different symbol,
wherein the information further includes a second reference signal resource for a cell-specific reference signal (CRS) in the unlicensed band, and
wherein the second reference signal resource is assigned to a CRS RE corresponding to a position to which a frequency shift is applied and a CRS RE whose position is defined by a cell identifier.

6. The method of claim 5, wherein the first reference signal resource is composed of 4 REs and each of the 4 REs is mapped to a different antenna port.

7. The method of claim 5, wherein the second reference signal resource is assigned to a CRS RE corresponding to a position to which a frequency shift is applied only in a specific symbol of a subframe.

8. The method of claim 7, wherein the specific symbol is a first symbol or first two symbols of the subframe.

* * * * *